(12) United States Patent
Bariau et al.

(10) Patent No.: US 10,927,832 B2
(45) Date of Patent: Feb. 23, 2021

(54) PERISTALTIC PUMP WITH IMPROVED PIPE ATTACHMENT

(71) Applicant: MOUVEX, Auxerre (FR)

(72) Inventors: Fabrice Bariau, Arras (FR); Michel Girard, Montboucher sur Jabron (FR)

(73) Assignee: MOUVEX, Auxerre (FR)

( * ) Notice: Subject to any disclaimer, the term of this patent is extended or adjusted under 35 U.S.C. 154(b) by 563 days.

(21) Appl. No.: 15/569,625

(22) PCT Filed: Jun. 22, 2016

(86) PCT No.: PCT/FR2016/051531
§ 371 (c)(1),
(2) Date: Mar. 23, 2018

(87) PCT Pub. No.: WO2016/207550
PCT Pub. Date: Dec. 29, 2016

(65) Prior Publication Data
US 2018/0195507 A1    Jul. 12, 2018

(30) Foreign Application Priority Data

Jun. 23, 2015 (FR) ...................................... 1555775

(51) Int. Cl.
*F04B 53/16* (2006.01)
*F04B 43/08* (2006.01)
(Continued)

(52) U.S. Cl.
CPC .............. *F04B 53/16* (2013.01); *F04B 43/08* (2013.01); *F04B 43/12* (2013.01); *F16L 21/04* (2013.01); *F16L 23/02* (2013.01)

(58) Field of Classification Search
CPC .......... F04B 43/12; F04B 43/08; F04B 53/16; F16L 23/02; F16L 21/04; F16L 58/187
(Continued)

(56) References Cited

U.S. PATENT DOCUMENTS

| 4,487,438 A * | 12/1984 | Sweeney ........................ 285/368 |
| 8,857,861 B2 * | 10/2014 | German .................. F16L 21/04 |
| | | 285/368 |

(Continued)

FOREIGN PATENT DOCUMENTS

| EP | 0569875 A1 | 11/1993 |
| EP | 2447532 A2 | 5/2012 |
| GB | 2521226 A | 6/2015 |

OTHER PUBLICATIONS

International Search Report for PCT Patent App. No. PCT/FR2016/051531 (dated Oct. 6, 2016) with English translation.
(Continued)

*Primary Examiner* — Zachary T Dragicevich
(74) *Attorney, Agent, or Firm* — Kenealy Vaidya LLP

(57) ABSTRACT

A peristaltic pump (1) comprising a pump body (2), an inlet (21), an outlet (22) and a pipe (4) attached to the inlet (21) and to the outlet (22) by a device comprising: —a flange (5) held to the pump body (2) by a bracket (6), —an insert (8), inserted against the inner wall (41) of the pipe (4) and comprising a shoulder (82), the inner wall of which bears against the outer wall (52) of the flange (5), characterised in that the pump body (2) comprises an inner circular groove (23) at the inlet (21) and at the outlet (22), and in that the securing device comprises a deformable elastic ring (10) inserted into said circular groove (23), and a pusher (11) having the shape of a ring comprising a projection matching the shape of the groove, the elastic ring (10) being compressed by the pusher (11).

5 Claims, 2 Drawing Sheets

(51) Int. Cl.
    *F16L 21/04*           (2006.01)
    *F16L 23/02*           (2006.01)
    *F04B 43/12*           (2006.01)

(58) Field of Classification Search
    USPC ........................................................ 285/368
    See application file for complete search history.

(56) References Cited

U.S. PATENT DOCUMENTS

2015/0377392 A1*  12/2015  Dell'Acqua ............ F16L 23/02
2016/0312774 A1*  10/2016  Oude Vrielink ........ F04B 53/16

OTHER PUBLICATIONS

Written Opinion for PCT Patent App. No. PCT/FR2016/051531 (dated Oct. 6, 2016).

* cited by examiner

PERISTALTIC PUMP WITH IMPROVED PIPE ATTACHMENT

CROSS REFERENCE TO RELATED APPLICATION(S)

This application is a national phase filing under 35 C.F.R. § 371 of and claims priority to PCT Patent Application No. PCT/FR2016/051531, filed on Jun. 22, 2016, which claims the priority benefit under 35 U.S.C. § 119 of French Patent Application No. 1555775, filed on Jun. 23, 2015, the contents of each of which are hereby incorporated in their entireties by reference.

BACKGROUND

Some embodiments are directed to the field of pumps used for pumping a liquid or a gas. Particularly, some embodiments are directed to a peristaltic pump with improved seal and attachment of the flexible pipe serving for transport of fluids.

Peristaltic pumps have applications in various fields. They have the advantage of allowing pumping of fluids without risk of contamination. In fact, on displacement of a liquid or gaseous fluid, this remains inside the pipe and does not come into contact with any other element of the pump.

A peristaltic pump includes a pump body which contains a flexible pipe and a rotating element with rollers, pulleys or skids which apply pressure and deform the flexible pipe during rotation of the rotating element in order to cause displacement of the fluid. The pump body also includes a lubricant serving to cool the pipe.

As the flexible pipe is under heavy load during function of the pipe, its attachment to the pump body must or should be particularly robust and tightly sealed.

Known peristaltic pumps may be equipped with a pipe fixing device composed of an insert starting from a flange and inserted against the inner wall of the pipe, and a collar which clamps the pipe in order to compress it against the insert. This collar also ensures the seal between the pipe and the insert. Also, to ensure the seal between the pipe and the pump body, an elastomer sleeve is arranged between the outer wall of the pipe and the pump body. This sleeve is fixed to the pump body by a first collar and to the pipe by a second collar.

The seal of known peristaltic pumps is not satisfactory. In fact leaks persist between the pipe and the pump body, and also between the pipe and the insert. In addition, a large number of components, in particular collars, are used, which entails significant costs in production.

The known peristaltic pumps may also be equipped with a conical insert or olive inserted against the inner wall of the pipe, compressing the latter against the pump body. This insert is fixed to the pump body by a flange.

The seal of this system is also not satisfactory, since the compression of the pipe is not adjustable and hence is very sensitive to dimensional variations of the pipe.

SUMMARY

The aspect of some embodiments is to propose a peristaltic pump with reinforced seal between the pipe and the pump body and between the pipe and the insert. Another aspect of some embodiments is to improve the attachment of the pipe to the pump body while retaining a degree of tolerance for the variation in length of the pipe. Another aspect of some embodiments is to simplify the attachment of the pipe to the pump body.

These aspects are achieved using a peristaltic pump including a pump body with an inlet, an outlet and a flexible curved pipe arranged between the inlet and the outlet, the flexible pipe including an inner wall and an outer wall, and a first and a second end each fixed to the pump body by a fixing device, the fixing device including:

a flange with an inner wall and an outer wall, held on the pump body by at least one bracket, an insert inserted against the inner wall of the pipe and including a shoulder with an inner wall and an outer wall, the inner wall of the shoulder resting against the outer wall of the flange, characterized in that the pump body includes an inner circular groove at the inlet and at the outlet, and in that the fixing device includes a deformable elastic ring inserted into the circular groove, and a pusher fixed to the pump body and having the shape of a ring including a protrusion complementary to the shape of the groove, the elastic ring being compressed by the pusher with a pressure which is adjustable independently of the bracket and the flange.

The peristaltic pump according to some embodiments therefore includes an improved attachment system at the inlet and outlet, which system includes—as well as the insert used in the known fashion on this type of pump—a deformable elastic ring inserted in a groove in the pump body and compressed by the pusher. In this way, the elastic ring rests on the outer wall of the pipe with a specific force in order to compress it against the insert and thus improve the seal between the pipe and the insert.

The material constituting the elastic ring also ensures the seal between the pipe and the pump body by plugging the voids between the outer wall of the pipe and the inner wall of the pump body. Also, the compression applied to the pipe further reinforces its attachment to the pump body.

Also, thanks to the use of the fixing system according to some embodiments, it may no longer be necessary to use an elastomer sleeve between the outer wall of the pipe and the pump body, nor a collar for fixing this to the body and to the pipe. Therefore the attachment of the pipe to the pump body is also simplified. This simplification thus allows significant savings to be made because of the omission of the sleeve and the reduction in the number of collars that may be required.

Also, since the pusher is fixed directly to the pump body, it is possible to act on the pusher independently of the flange, and to act on the flange independently of the pusher.

According to one embodiment, the fixing device includes at least two elastic rings and at least one rigid ring, which are inserted in the circular groove and arranged such that each elastic ring is separated from the other by a rigid ring. By alternating elastic rings with rigid rings, for example made of steel, greater forces can be applied to the pipe. Thus the seal of the pump can be further improved.

Advantageously, the elastic ring is an elastomer. Elastomer is a material which has the advantage of tolerating very great deformations and resuming its initial form at the end of such stress.

According to one embodiment, the pusher is held on the pump body by at least one screw, and the screw allows adjustment of the pressure exerted by the pusher on the elastic ring. Thus the pressure exerted by the pusher on the elastic ring is adjustable. It may therefore be adjusted for example according to the characteristics of the material of the elastic ring and/or of the pipe.

According to another embodiment, the flange includes a recess allowing passage of the screw fixing the pusher. Thanks to this recess, access to the screw, for adjustment of the pressure applied to the elastic ring, is facilitated.

BRIEF DESCRIPTION OF THE FIGURES

Some embodiments will be better understood and further characteristics and/or advantages will appear from reading the description below of a possible embodiment, given merely as a non-limitative example, in connection with the attached drawings in which.

DETAILED DESCRIPTION OF THE EMBODIMENTS

Figure 1:
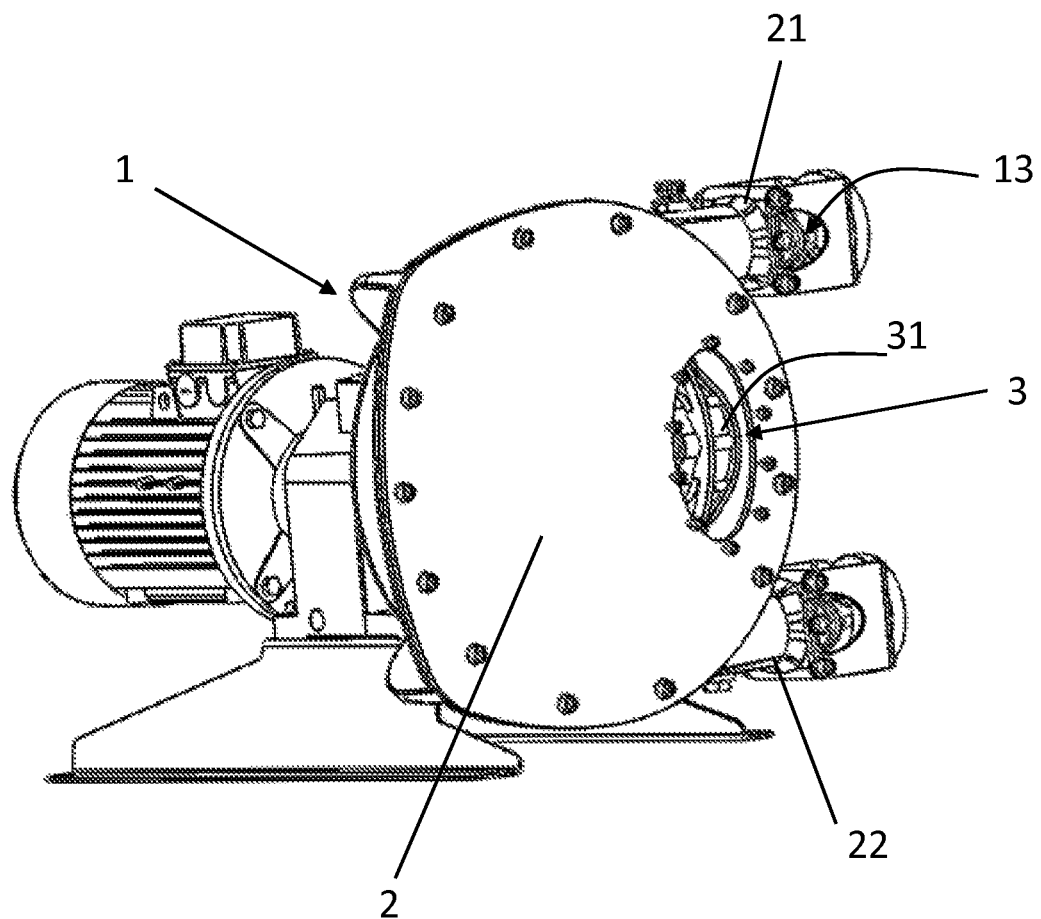
FIG. 1 is a view of a peristaltic pump according to some embodiments.

A peristaltic pump 1 according to some embodiments is shown on FIG. 1. This pump includes a pump body 2 with an inlet 21 and an outlet 22, or vice versa depending on the rotation direction of the pump. This pump body 1 contains in its interior a flexible pipe 4 of a known type, a first end of which is arranged at the inlet 21 and a second end at the outlet 22. The pipe 4 also includes an inner wall 41 and an outer wall 42. In the known fashion, inside the pump body 2, the pump 1 also contains a rotating element of a known type, for example a wheel with skids 31 visible through the opening 3. During its rotation, this rotating element applies pressure to the flexible pipe 4 in order to cause the displacement of a fluid between the inlet 21 and the outlet 22.

Figure 2:
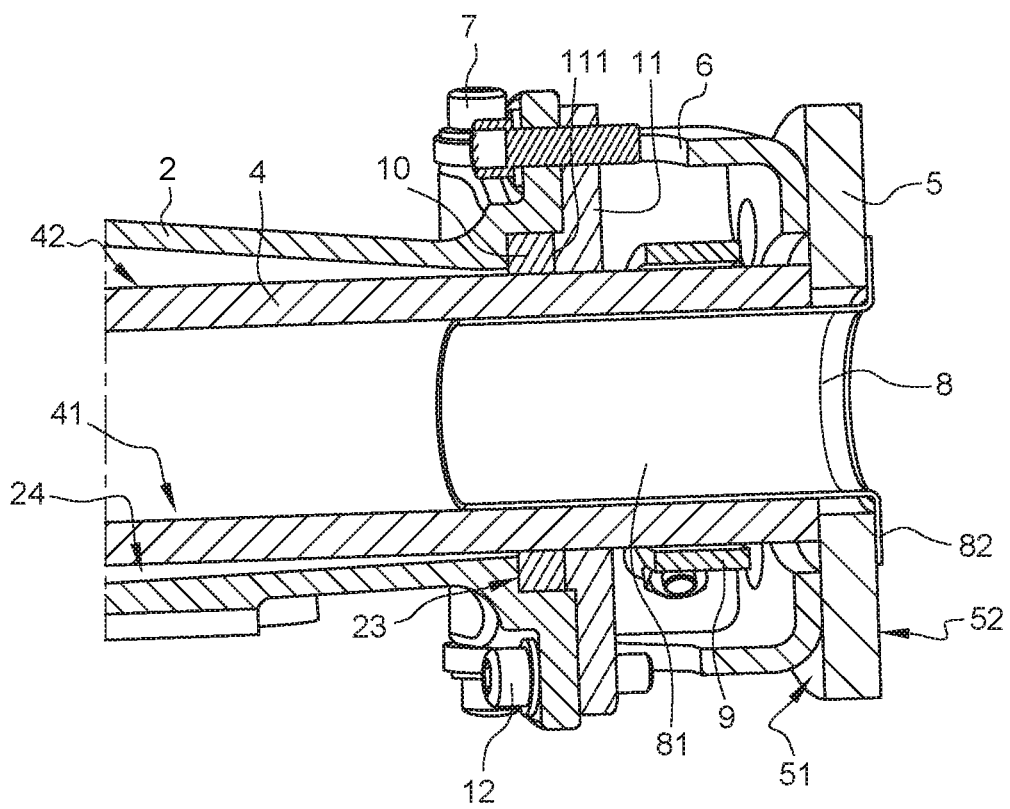
FIG. 2 is a longitudinal section view of the inlet or outlet of the pump equipped with a fixing system according to some embodiments.

To ensure the leak-tightness of the pump 1, the pipe 4 is attached to the inlet 21 and outlet 22 by a fixing device, an example of which is shown in FIG. 2.

In this example, the fixing device includes a flange 5 with an inner wall 51 and an outer wall 52. This flange is held on the pump body 2 by at least one bracket 6.

This bracket is fixed to the pump body 2 by screws 7 for example.

The fixing device also includes an insert 8 with a tubular portion 81 and a shoulder 82 at one end of the tubular portion 81. The shoulder 82 includes an inner wall 821.

To attach the pipe 4 to the flange 5, the tubular portion 81 is inserted against the inner wall 41 of the pipe 4, and the inner wall 821 of the shoulder 82 of the insert 8 rests against the outer wall 52 of the flange 5.

Optionally, to improve the attachment of the pipe 4 to the pump body 2, the fixing system may include one or more clamps 9.

At the inlet 21 and outlet 22, the pump body includes an inner circular groove 23 in which a deformable elastic ring 10 is inserted, for example made of elastomer. The ring 10 is compressed by a pusher 11. This pusher 11 has the shape of a ring and includes a protrusion 111 complementary to the shape of the groove 23. The pusher 11 is fixed to the inlet 21 or outlet 22 of the pump body 2 via at least one screw 12. This screw 12 also serves to adjust the pressure exerted by the pusher 11 on the elastic ring 10, such that the elastic ring 10 rests with a specific force on the outer wall 42 of the pipe 4 in order to compress it against the insert 8 and thus improve the seal between the pipe 4 and the insert 8.

Finally, in this exemplary embodiment, the pusher 11 is fixed directly to the pump body by the screw 12, independently of the bracket 6 and the flange 5.

The advantage of this arrangement is that the pressure exerted by the pusher 11 on the elastic ring 10 can be adjusted independently of the other elements constituting the fixing system.

Thus the pusher 11 can be tightened to increase the pressure applied to the elastic ring 10 without being limited by the length of the pipe 4. This allows a degree of tolerance for the length of the pipe which may vary from one pipe to the next during production, or simply due to the effect of variation of temperature.

In fact, if the flange 5 is tightened at the same time as the pusher 11 by a same screw, the pressure applied to the elastic ring 10 may be limited by the length of the pipe, which would prevent any tolerance in the length of the pipe.

Also, with this arrangement, it is possible to prevent the transmission of vibrations from the flange 5 to the pusher 11, which could affect the stability of the tightening by the screw 12.

The material of the elastic ring 10 also ensures the seal between the pipe 4 and the pump body 2 by plugging the voids between the outer wall 42 of the pipe 4 and the inner wall 24 of the pump body 2.

In order to allow easy access to the screw 12 for tightening or loosening the pusher 11, a recess 13 is provided in the flange 6.

According to one embodiment, the fixing device includes at least two elastic rings 10 and at least one rigid ring, which are inserted in the circular groove 23 and arranged such that each elastic ring 10 is separated from the other by a rigid ring. Thus it is possible to increase the pressure applied to the pipe 4.

The invention claimed is:

1. A peristaltic pump comprising a pump body with an inlet, an outlet and a flexible curved pipe arranged between the inlet and the outlet, a rotating element to apply pressure and deform the pipe during rotation of the rotating element in order to cause displacement of the fluid, the flexible pipe comprising an inner wall and an outer wall, and a first and a second end each fixed to the pump body by a fixing device, the fixing device comprising:

a flange with an inner wall and an outer wall, held on the pump body by at least one bracket; and an insert inserted against the inner wall of the pipe and comprising a shoulder with an inner wall and an outer wall, the inner wall of the shoulder resting against the outer wall of the flange, wherein the pump body comprises an inner circular groove at the inlet and at the outlet, and in that the fixing device comprises a deformable elastic ring inserted into the circular groove, and a pusher fixed to the pump body and having the shape of a ring comprising a protrusion complementary to the shape of the groove, wherein the pusher is fixed directly to the pump body such that it is possible to act on the pusher independently of the flange and to act on the flange independently of the pusher, the elastic ring being compressed by the pusher with a pressure which is adjustable independently of the bracket and the flange.

2. The peristaltic pump as claimed in claim 1, wherein the fixing device comprises at least one elastic ring and at least one rigid ring, which are inserted in the circular groove and arranged such that each elastic ring is separated from the other by a rigid ring.

3. The peristaltic pump as claimed in claim 1, wherein the elastic ring is an elastomer.

4. The peristaltic pump as claimed in claim 1, wherein the pusher is held on the pump body by at least one screw, and in that the screw allows adjustment of the pressure exerted by the pusher on the elastic ring.

5. The peristaltic pump as claimed in claim 4, wherein the flange comprises a recess allowing passage of the screw fixing the pusher.

\* \* \* \* \*